Dec. 29, 1953  E. J. MEYER ET AL  2,664,028
SLIT MECHANISM
Filed Dec. 31, 1948

INVENTORS
Edgar J. Meyer
James L. Read
BY
ATTORNEYS

Patented Dec. 29, 1953

2,664,028

UNITED STATES PATENT OFFICE 2,664,028

SLIT MECHANISM

Edgar J. Meyer, Buffalo, and James L. Read, Snyder, N. Y., assignors to American Optical Company, Southbridge, Mass., a voluntary association of Massachusetts Application December 31, 1948, Serial No. 68,682

1 Claim. (Cl. 88—61)

This invention relates to adjustable slit mechanisms for use in spectroscopic, ophthalmic and other instruments having need for accurately formed parallel-sided slits which may be readily adjusted to various sizes throughout a predetermined range.

While many slit mechanisms have already been provided for such instruments and some of these appear to be of relatively simple construction, the problems of providing a highly accurate parallel-sided slit, particularly at very narrow slit openings, has been a difficult job and often time consuming to assemble accurately. Furthermore, a good slit mechanism should be of a durable character, maintaining its accuracy even after it has been used extensively. This some of the slit mechanisms of earlier construction failed to do.

It is, accordingly, an object of the present invention to provide a slit mechanism which is simple in construction, inexpensive to manufacture, easy to assemble and highly accurate throughout its normal range of adjustment, even at exceedingly small slit openings. It is also an object to provide a slit mechanism of a construction which is free from wear and like conditions which might require readjustment or reconditioning after the mechanism has been used considerably.

Other objects and advantages of the invention will become apparent from the detailed description which follows when taken in conjunction with the accompanying drawing in which.

Figure 1:
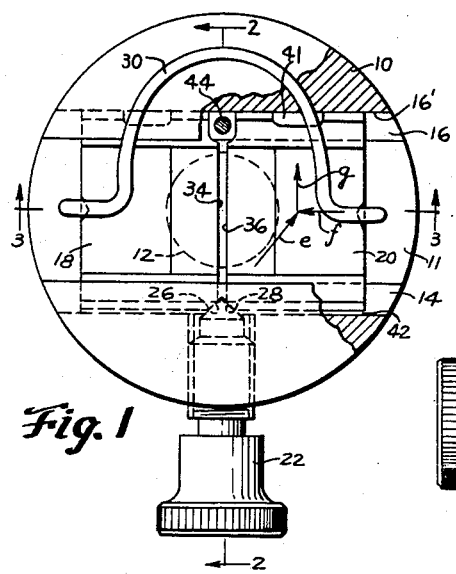
Fig. 1 is a plan view of a preferred embodiment of a slit mechanism embodying the invention.
Figure 2:
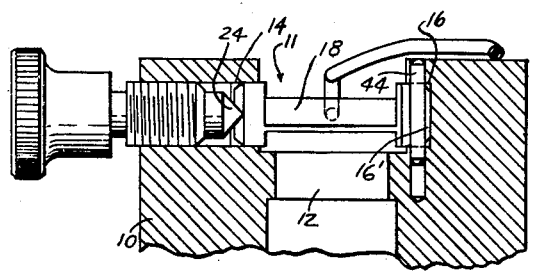
Fig. 2 is a vertical sectional view taken substantially on line 2—2 of Fig. 1.

In Fig. 1 the numeral 10 indicates a base or support provided with a transverse channel 11 for receiving the slit forming members of the device. An opening 12 for the passage of light through the support 10 is provided centrally relative to this channel and at opposite sides of the channel are formed opposed channel shaped guide ways 14 and 16 (see Fig. 2) which serve to confine opposite edge portions of a pair of adjustable slit blocks 18 and 20 in position in front of the opening 12. Only the trough surface 16' of the channel 16 need be accurately finished as a flat rectilinear surface. The blocks 18 and 20 may be readily moved toward or away from each other by use of a manually operable control or adjusting screw 22.

Figure 3:
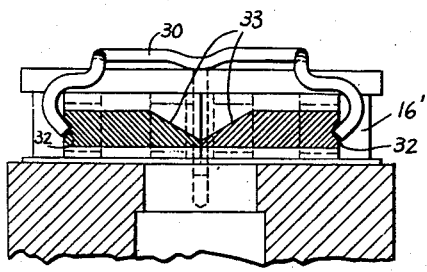
Fig. 3 is a vertical sectional view taken substantially on line 3—3 of Fig. 1.

The inner end 24 of the screw 22 is conically tapered or shaped so as to engage angularly disposed surface portions 26 and 28 of the blocks 18 and 20, respectively, and these angular or sloping surfaces slope in the same general direction as the engaging tapered portions of the end 24 of screw 22. A generally U-shaped spring 30 is provided for urging the blocks 18 and 20 toward each other and the opposite ends of this spring are turned inwardly toward each other so that they may engage recesses 32 (Fig. 3) formed in the outer edges of the blocks. The inner central portions of the blocks 18 and 20 are reduced in thickness or tapered down as shown at 33 so that the inner slit forming edges 34 and 36 thereof may have relatively thin slit forming surfaces and will present relatively small areas which must be accurately finished for parallelism.

It will be readily apparent when considering any slit mechanism, that as the slit is decreased in width, any departure from a true parallel condition of the opposed surfaces forming the slit becomes more noticeable and objectionable the smaller the slit becomes. For example, if slit forming edges are only five one hundred thousandths of an inch from a true parallel condition when the slit is adjusted to an opening of substantially fifty one hundred thousandths, this non-parallel condition may not be readily noticeable. However, if the slit mechanism is readjusted to an opening of only ten one hundred thousandths, and the same five one hundred thousandths error is present, the error will be readily apparent since the slit at such a time will be twice as wide at one end as at the other.

Figure 4:
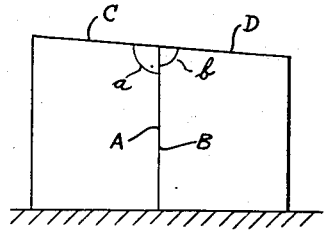
Figs. 4 and 5 are diagrammatic views showing steps in the manufacture of slit blocks, which steps might readily be employed in the manufacture of the slit blocks provided in the slit mechanism of Fig. 1.
Figure 5:
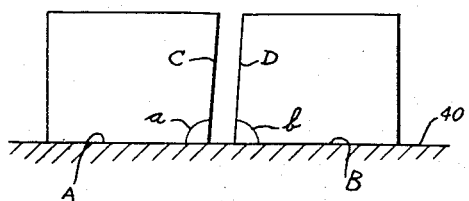

In order to produce a highly accurate slit for the mechanism of the present invention, the slit blocks 18 and 20 (which are preferably generally rectangular in shape to start with) need only have two adjacent related surfaces of each accurately finished in the following manner. These four edges or surfaces on the blocks are the bearing surfaces which are to slide upon the accurately formed guiding surface 16' and the surfaces adjacent thereto which are to form the slit opening of the device. Either the bearing surfaces of both blocks or the slit surfaces thereof may be finished first as accurately formed and preferably honed or lapped flat surfaces. The first finished pair of surfaces may be represented by the letters A and B in Fig. 4 and these surfaces are clamped together firmly so that the other pair of surfaces which are also to be accurately finished as flat surfaces in like manner will be adjacent as represented by letters C and D. (Or obviously a parallel spacer might be used therebetween for protection.) It is not necessary that the included angles $a$ and $b$ between these accurately finished surfaces be accurately 90° to the exact minute and second but merely preferable that they be approximately 90° for, as will be apparent from inspection of Fig. 5, when these blocks are properly rotated to place the first pair of finished surfaces A and B in common alignment or against a flat supporting surface such as indicated at 40 the other pair of finished surfaces C and D thereof will be adjacent and any slit formed therebetween will have parallel sides even though the angles $a$ and $b$ may not be equal. This is true since one of these angles is always the supplement of the other. Or, as indicated in Fig. 5, the slit surfaces C and D might be first formed and then clamped together and the surfaces A and B formed simultaneously. The angle $a$ would still be supplemental to the angle $b$ and approximately 90°.

The blocks or slit members 18 and 20 when assembled in the slit device are constantly urged toward each other by the spring 30 and the amount of separation therebetween which provides the slit for the device is governed by the position to which the inner end 24 of the control 22 has been adjusted. As previously stated, the inner end 24 is conically tapered or shaped for engagement with the similarly angled or sloped surfaces 26 and 28 of the blocks and these angles are carefully chosen for purposes which will now be described. The recesses 32 for the opposite ends of the spring 30 are so located in the slide blocks 18 and 20 and the surfaces 26 and 28 are so angularly disposed that the lines of force exerted by the end of the screw 22 while holding the blocks separated act in directions normal to these sloping surfaces 26 and 28, (see vector $e$ in Fig. 1), and intersect the lines of force exerted by the spring pressure and tending to move the blocks inwardly, (see vector $f$) at such points that the resultant forces, which act normal to the guide surface 16' (see vector $g$) will be substantially midway between the ends of the guide surfaces on the blocks 18 and 20, respectively. The result of this arrangement is that a balanced condition is produced at all times, the pressure between each block and the guide surface 16' is evenly distributed and the parallelism of the slit will not be changed should any wear take place between the block's bearing surface and the surface 16' during repeated use of the device. In fact, this balancing of forces allows the use of blocks having relatively small spaced bearing surfaces as shown in Fig. 1 separated by recess 41, instead of a single larger surface, a condition which allows each block to be more easily and accurately finished.

It will be noted that the opposite end portions of the blocks 18 and 20 are merely supported and confined closely at the top and bottom thereof by the guideways 14 and 16 while only the recessed bearing edges of the blocks need be highly finished for accurate straight line sliding engagement with the surface 16'. Accordingly, the other surfaces of the blocks adjacent surfaces of the guideways 14 and 16 need not be so carefully and accurately finished. Normally the blocks will be held by the screw and spring against the surface 16' and a small space, represented by numeral 42, will exist adjacent the opposite ends thereof. Thus it will be apparent that any wear occurring between the blocks 18 or 20 and the guide surface 16' or between the surfaces 26 and 28 and the end of the screw 22, will not disturb the balanced forces described above nor the parallelism existing between the slit forming edges 34 and 36 thereon. Obviously, instead of a rotatable screw having a tapered end for actuating the slit blocks 18 and 20, other means such as a slideable nonrotatable member having a tapered end could be provided and actuated by a suitable control lever, screw or equivalent means.

A pin 44 is provided in the support 10 and located substantially in alignment with the screw 22 in such a manner that it traverses the guideway 16 and serves as means to prevent the blocks 18 and 20 from becoming detached from the guideways should the screw or control 22 at any time be retracted to such an extent that the end thereof is completely withdrawn from the path of members 18 and 20. The blocks 18 and 20 are recessed slightly to accommodate this pin and still allow complete closing of the slit.

The slit mechanism just described is particularly useful in instruments, devices or the like where only a relatively small space is available for same.

We claim:

An adjustable slit mechanism of the character described comprising a support, guide means carried by said support including at least one accurately finished rectilinear guide surface, a pair of movable members supported by said support and having rectilinear bearing surfaces in engagement with said guide surface, a pair of adjacent complementary slit-forming edges carried by said movable members, spring means operatively associated with said members and arranged to constantly urge said members toward each other, a pair of sloping surfaces upon adjacent portions of said movable members, and an adjustable element carried by said support and having a wedge shaped portion adapted to be moved into various predetermined positions of adjustment in engagement with said sloping surfaces for holding said complementary edges on said members in spaced relation in opposition to the spring pressure to form a parallel-sided slit of desired width therebetween, and for holding said members in engagement with said accurately finished guide surface, each sloping surface being so angularly disposed upon the associated movable member that a line normal thereto will intercept the line of force exerted by said spring at a plane which is normal to said rectilinear guide surface and substantially midway between the ends of the bearing surface or surfaces of the associated movable member.

EDGAR J. MEYER.
JAMES L. READ.

References Cited in the file of this patent

UNITED STATES PATENTS

| Number | Name | Date |
|---|---|---|
| 1,024,242 | Atherton | Apr. 23, 1912 |
| 2,021,232 | Fasin | Nov. 19, 1935 |

FOREIGN PATENTS

| Number | Country | Date |
|---|---|---|
| 681,225 | France | Jan. 28, 1930 |